(12) United States Patent
Hosomi et al.

(10) Patent No.: US 6,269,297 B1
(45) Date of Patent: Jul. 31, 2001

(54) TRACTION CONTROL APPARATUS AND METHOD FOR VEHICLES

(75) Inventors: Kazushi Hosomi; Masashi Takagi, both of Susono; Mitsuyoshi Yokokawa, Toyota; Yasuhiro Saito, Okazaki, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/580,269

(22) Filed: May 26, 2000

(30) Foreign Application Priority Data

Jun. 8, 1999 (JP) .................................................. 11-160885

(51) Int. Cl.[7] ....................................................... G06F 7/00
(52) U.S. Cl. ................................. 701/82; 701/83; 701/84; 180/197
(58) Field of Search ................................. 701/82, 83, 84, 701/87, 88, 90; 303/91; 180/197

(56) References Cited

U.S. PATENT DOCUMENTS

| | | | | |
|---|---|---|---|---|
| 5,961,565 | * | 10/1999 | Kawabe et al. | 180/197 |
| 5,971,089 | * | 10/1999 | Sawada | 701/83 |
| 5,978,726 | * | 11/1999 | Takeda et al. | 701/84 |
| 6,012,011 | * | 1/2000 | Johnson | 701/82 |
| 6,122,585 | * | 9/2000 | Ono et al. | 701/90 |
| 6,199,005 | * | 3/2001 | Iwata | 701/87 |

FOREIGN PATENT DOCUMENTS

| | | | |
|---|---|---|---|
| 0238513 | * | 10/1986 (JP) | 180/197 |
| 5-58264 | | 3/1993 (JP) . | |
| 10-236297 | | 9/1998 (JP) . | |

* cited by examiner

*Primary Examiner*—Richard M. Gamby
(74) *Attorney, Agent, or Firm*—Oliff & Berridge, PLC (57) ABSTRACT

A traction control apparatus for vehicles according to the present invention has a slip state detector for detecting a slip state of a wheel, a parameter determining device for determining a control parameter for generating braking force according to the slip state detected, a control permitting device for permitting traction control, a parameter changer for changing the control parameter so as to decrease the braking force when the control parameter is one to generate the braking force at the wheel over permissible braking force at the start of control, and a traction control for executing the traction control, based on the control parameter. Thus the apparatus can restrain uncomfortableness during the traction control and can prevent large input from entering the power train.

16 Claims, 5 Drawing Sheets

TRACTION CONTROL APPARATUS AND METHOD FOR VEHICLES

BACKGROUND OF THE INVENTION

1. Field of the Invention

The present invention relates to a traction control apparatus and method for vehicles, which restrains an acceleration slip at wheels.

2. Related Background Art

There are practical traction control systems intended for efficiently yielding traction by restraining the acceleration slip at the wheels mounted on vehicles. An example of such known traction control systems is one as described in Japanese Patent Application Laid-Open No. 5-58264. The traction control system is constructed to detect slip states (for example, slip rates or the like) of the wheels and exert braking force according to the slip states on the wheels, so as to restrain the acceleration slip and maintain frictional force between wheels and road surface, thereby efficiently yielding the traction.

There are also cases wherein the traction control apparatus is designed to control the driving force generated by an engine and transmitted to driven wheels instead of the braking force. In some of these cases, the traction control apparatus is constructed to detect the slip states of the wheels and decrease the driving force transmitted to the wheels in accordance with the slip states, so as to restrain the acceleration slip and maintain the frictional force between wheels and road surface, thereby efficiently producing the traction. In certain cases both the acceleration-slip prevention by the braking force control and the acceleration-slip prevention by the driving force reduction as described above are used in combination. In such traction control, increase amounts of the braking force and/or decrease amounts of the driving force described above become larger as the slip states of the wheels become more prominent (for example, as the slip rates increase).

SUMMARY OF THE INVENTION

The traction control is normally started after predetermined control permission conditions are met. For example, in order to permit the traction control only when a driver has the will to run, the condition that the stroke of the accelerator pedal is not less than a predetermined value is set as one of the control permission conditions. In some cases the traction control is actively inhibited in order to prevent a breakdown of the brake actuator, for example, during hot periods of the brake actuator, and the condition that the traction control is not in such an inhibited state is set as one of the control permission conditions.

For this reason, if the slip rates of the wheels are already large at the start of the traction control after the control permission conditions are met, great braking force will be exerted on the wheels or reduction of the driving force will be large in the initial stage of the traction control. For example, the slip rates are already large in cases wherein from such a state that one wheel is spinning in a ditch or in a stuck state the driver steps the accelerator pedal down over the predetermined pedal stroke described above; then the control amounts are large in the initial stage of control in these cases. When the inhibited state of the traction control as described above is released during acceleration, the slip rates of the wheels are also already large and thus the control amounts are great in the initial stage of control.

When the traction control is activated to exert large braking force on the wheel demonstrating the large slip rate, the driver must feel great jerky motion of the vehicle and thus feel uncomfortable. If the traction control with large decrease of the driving force is effected at the wheel demonstrating the large slip rate, a stall feeling, an engine shake due to a sudden drop of engine power output, or the like will arise, so as to cause the driver to feel uncomfortable.

Further, if large braking force is exerted on the spinning wheel immediately after the start of the traction control, the wheel will suddenly stop spinning and thus a large torque will be exerted on the power train, so as to increase the load on the power train.

Yet further, in cases wherein the slip rate of only one wheel is large because of the stuck state thereof, when large braking force is produced at the wheel of the large slip rate, the driving force causing the wheel of the large slip rate to spin is suddenly delivered to the other wheel by the differential gear mechanism, so as to cause the vehicle to rush out, thereby making the driver feel uncomfortable.

There were thus demands for further improvement.

An object of the present invention is, therefore, to provide a traction control apparatus and method for vehicles that can restrain the uncomfortableness during the traction control and that can restrain large input into the power train.

A traction control apparatus for vehicles according to the present invention comprises: slip state detecting means for detecting a slip state of a wheel mounted on a vehicle; parameter determining means for determining a control parameter for generating braking force according to the slip state detected by the slip state detecting means; control permitting means for permitting traction control; parameter changing means for changing the control parameter so as to decrease the braking force generated at the wheel when the control parameter determined from the slip state of the wheel at the time of permission of the traction control by the control permitting means is one to generate the braking force at the wheel over permissible braking force which is permissible at a start of the control; and traction control means for executing the traction control by controlling the braking force at the wheel, based on the control parameter.

In the traction control apparatus for vehicles according to the present invention, when the control parameter determined from the slip state of the wheel at the time of permission of the traction control given by the control permitting means is one to generate the braking force at the wheel over the permissible braking force, the parameter changing means changes the control parameter so as to decrease the braking force by the traction control. This can prevent a large braking force from being exerted on the wheel at the control start of the traction control, whereby the driver can be prevented from feeling uncomfortable because of the jerky motion and the rushing motion of the vehicle. Since the large braking force can be prevented from being exerted suddenly on the wheel at the control start of the traction control, no large torque is exerted on the power train of the vehicle, so that the load is little on the power train.

In a preferred example, the traction control means comprises braking force adjusting means for effecting braking at the wheel by increasing hydraulic pressure in a wheel cylinder to urge a frictional material against the wheel or against a rotary member coupled thereto, the control parameter is a pressure increase rate of the hydraulic pressure, and the parameter changing means changes the pressure increase rate determined by the parameter determining means, to a lower rate. This makes a rise of the braking force gentler in the traction control, thereby decreasing the braking force by the traction control.

In another preferred example, the traction control means comprises braking force adjusting means for effecting braking at wheel by increasing hydraulic pressure in a wheel cylinder to urge a frictional material against the wheel or against a rotary member coupled thereto, the control parameter is a target pressure of the hydraulic pressure, and the parameter changing means changes the target pressure determined by the parameter determining means, to a lower pressure value. This decreases the maximum of the braking force in the traction control, thereby decreasing the braking force by the traction control.

Another traction control apparatus for vehicles according to the present invention comprises: slip state detecting means for detecting a slip state of a wheel mounted on a vehicle; parameter determining means for determining a control parameter for decreasing driving force transmitted to the wheel in accordance with the slip state detected by the slip state detecting means; control permitting means for permitting traction control; parameter changing means for changing the control parameter so as to decrease a decrease amount of the driving force when the control parameter determined from the slip state of the wheel at the time of permission of the traction control given by the control permitting means is one to cause a decrease of the driving force over a permissible decrease amount which is permissible at a start of the control; and traction control means for executing the traction control by decreasing the driving force transmitted to the wheel, based on the control parameter.

In the traction control apparatus for vehicles according to the present invention, when the control parameter determined from the slip state of the wheel at the time of permission of the traction control given by the control permitting means is one to cause the decrease of the driving force at the wheel over the permissible decrease amount, the parameter changing means changes this control parameter so as to decrease the decrease amount of the driving force by the traction control. Therefore, the apparatus can prevent the decrease of the driving force transmitted to the wheel from becoming large at the control start of the traction control and can thus prevent the driver from feeling uncomfortable because of the stall feeling and the engine shake due to a sudden drop of engine power.

In a preferred example, the traction control means comprises driving force adjusting means for adjusting driving force generated by an engine and transmitted to the wheel, the control parameter is intake air volume of the engine, and the parameter changing means changes the intake air volume determined by the parameter determining means, to larger volume so as to decrease the driving force. This suppresses a sudden drop of engine power and thus can decrease the decrease amount of the driving force in the traction control.

In another preferred example, the control parameter is a fuel injection amount of the engine and the parameter changing means changes the fuel injection amount to a smaller amount so as to decrease the driving force. In another preferred example, the control parameter is ignition timing of the engine and the parameter changing means changes the ignition timing so as to decrease the driving force.

In another preferred example, the traction control means comprises driving force adjusting means for adjusting driving force generated by an electric motor and transmitted to the wheel, the control parameter is output torque of the electric motor, and the parameter changing means changes the output torque determined by the parameter determining means, so as to decrease the driving force.

And, a traction control method for vehicles according to the present invention comprising the steps of: detecting a slip state of a wheel mounted on a vehicle; determining a control parameter for generating braking force according to the detected slip state; permitting traction control; changing the control parameter so as to decrease the braking force generated at the wheel when the determined control parameter at the time of permission of the traction control is one to generate the braking force at the wheel over permissible braking force at a start of the control; and executing the traction control by controlling the braking force at the wheel, based on the changed control parameter.

In the traction control method for vehicles according to the present invention, when the control parameter determined from the slip state of the wheel at the time of permission of the traction control is one to generate the braking force at the wheel over the permissible braking force, the determined control parameter is changed so as to decrease the braking force by the traction control. This can prevent a large braking force from being exerted on the wheel at the control start of the traction control, whereby the driver can be prevented from feeling uncomfortable because of the jerky motion and the rushing motion of the vehicle. Since the large braking force can be prevented from being exerted suddenly on the wheel at the control start of the traction control, no large torque is exerted on the power train of the vehicle, so that the load is little on the power train.

In a preferred example, the step of executing the traction control includes effecting braking at the wheel by increasing hydraulic pressure in a wheel cylinder to urge a frictional material against the wheel or against a rotary member coupled thereto, the step of determining the control parameter includes determining a pressure increase rate of the hydraulic pressure as the control parameter, and the step of changing the control parameter includes changing the determined pressure increase rate to a lower rate. This makes a rise of the braking force gentler in the traction control, thereby decreasing the braking force by the traction control.

In another preferred example, the step of executing the traction control includes effecting braking at the wheel by increasing hydraulic pressure in a wheel cylinder to urge a frictional material against the wheel or against a rotary member coupled thereto, the step of determining the control parameter includes determining a target pressure of the hydraulic pressure as the control parameter, and the step of changing the control parameter includes changing the determined target pressure to a lower pressure value. This decreases the maximum of the braking force in the traction control, thereby decreasing the braking force by the traction control.

Another traction control method for vehicles according to the present invention comprises the steps of: detecting a slip state of a wheel mounted on a vehicle; determining a control parameter for decreasing driving force transmitted to the wheel in accordance with the detected slip state; permitting traction control; changing the control parameter so as to decrease a decrease amount of the driving force when the determined control parameter at the time of permission of the traction control is one to cause a decrease of the driving force over a permissible decrease amount at a start of the control; and executing the traction control by decreasing the driving force transmitted to the wheel, based on the changed control parameter.

In the traction control method for vehicles according to the present invention, when the control parameter determined from the slip state of the wheel at the time of permission of the traction control is one to cause the decrease of the driving force at the wheel over the permissible decrease amount, the determined control parameter is changed so as to decrease the decrease amount of the driving force by the traction control. Therefore, the method can prevent the decrease of the driving force transmitted to the wheel from becoming large at the control start of the traction control and can thus prevent the driver from feeling uncomfortable because of the stall feeling and the engine shake due to a sudden drop of engine power.

In a preferred example, the step of executing the traction control includes adjusting driving force generated by an engine and transmitted to the wheel, the step of determining the control parameter includes determining intake air volume of the engine as the control parameter, and the step of changing the control parameter includes changing the determined intake air volume to larger volume so as to decrease the driving force. This suppresses a sudden drop of engine power and thus can decrease the decrease amount of the driving force in the traction control.

In another preferred example, the control parameter is a fuel injection amount of the engine and the fuel injection amount is changed to a smaller amount so as to decrease the driving force. In another preferred example, the control parameter is ignition timing of the engine and the ignition timing is changed so as to decrease the driving force.

In another preferred example, the step of executing the traction control includes adjusting driving force generated by an electric motor and transmitted to the wheel, the step of determining the control parameter includes determining output torque of the electric motor as the control parameter, and the step of changing the control parameter includes changing the determined output torque so as to decrease the driving force.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1A:
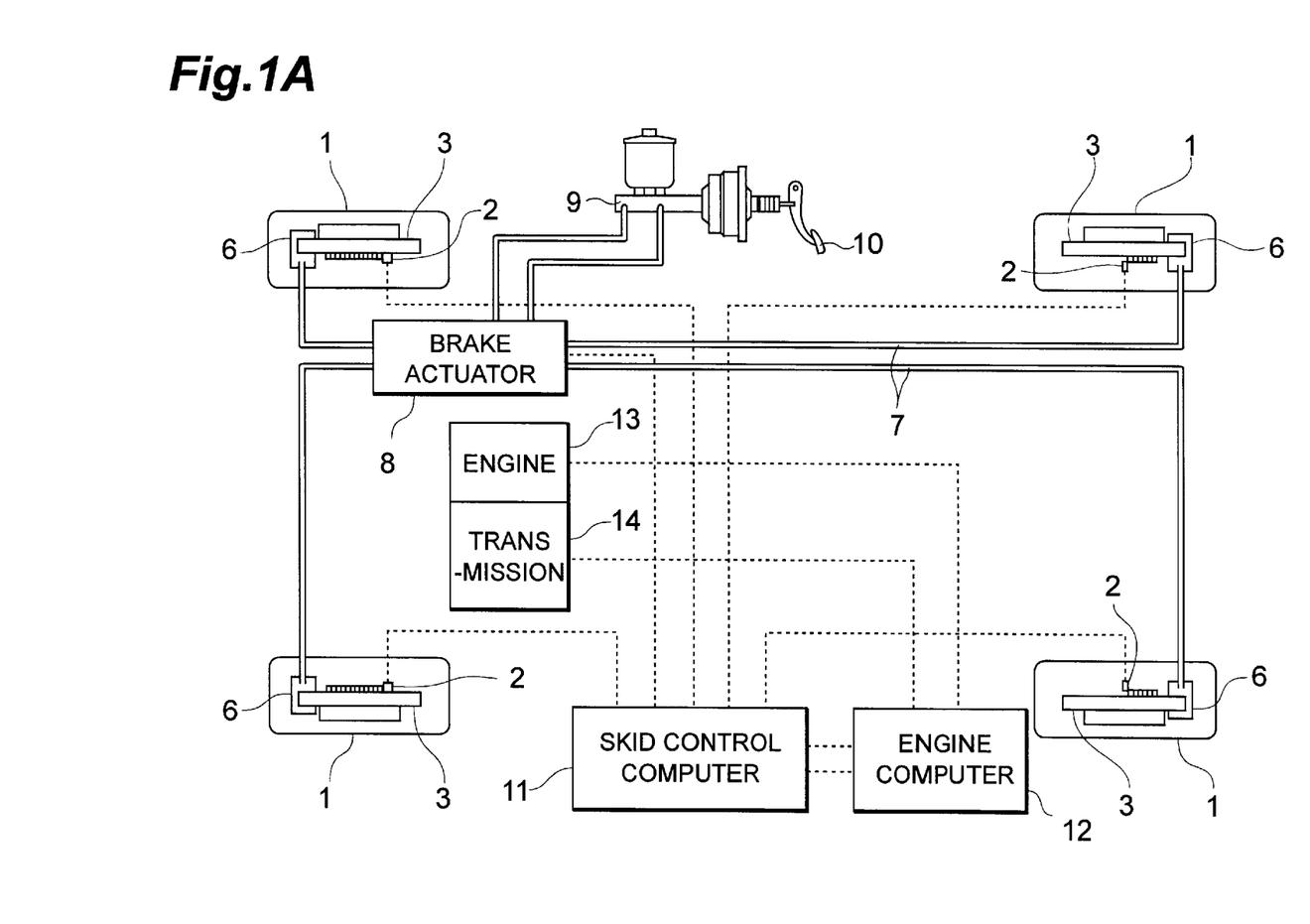
FIG. 1A is a structural diagram to show the structure of an embodiment of the traction control apparatus for vehicles according to the present invention.

An embodiment of the traction control apparatus and method for vehicles according to the present invention will be described. FIG. 1A shows the structure of the traction control apparatus of the present embodiment.

Figure 1B:
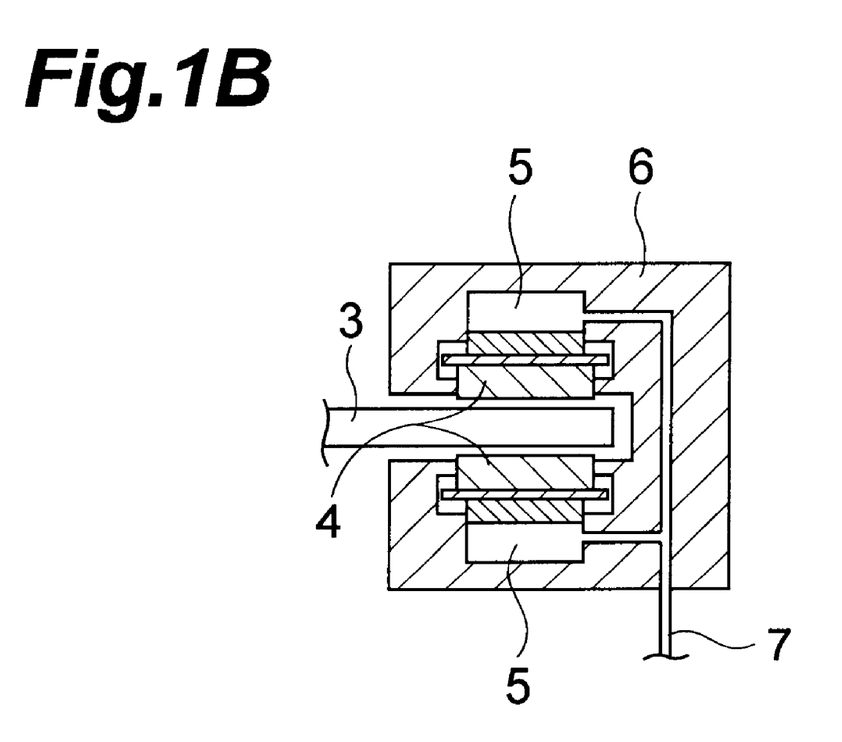
FIG. 1B is an enlarged sectional view of brake caliper.

Each wheel 1 is equipped with a wheel speed sensor 2 for detecting the wheel speed thereof. Each wheel 1 is also provided with a brake disk (rotary member) 3. Each brake disk 3 is equipped with a brake caliper 6 incorporating brake pads (friction linings) 4 and wheel cylinders 5 (see FIG. 1B). Each wheel cylinder 5 is connected via a brake tube 7 to a brake actuator 8.

The brake actuator 8 has pumps and valves. During the traction control brake oil in a master cylinder 9 is delivered via the brake tubes 7 to the wheel cylinders 5 by the pumps of the brake actuator 8, to increase the oil pressure (hydraulic pressure) in the wheel cylinders 5, thereby applying the brakes to the wheels 1. With increase in the oil pressure in the wheel cylinders 5, the brake pads 4 are urged against the brake disks 3, whereby frictional force effects braking at the wheels 1 coupled to the brake disks 3.

The brake actuator 8 adjusts the oil pressure in the wheel cylinders 5 by open/close duty ratios of the valves, thereby controlling the braking force at the wheels 1. In the driver's normal operation of the brake pedal 10, the oil pressure is also transferred via the brake actuator 8 to the wheel cylinders 5. The brake system of the present embodiment is a disk brake system, but it may also be a drum brake system. In the case of this drum brake system, the brake drums are the rotary members and the brake shoes are friction linings.

The wheel speed sensors 2 and the brake actuator 8 are connected to a skid control computer 11, which governs the global braking control of the vehicle. This skid control computer 11 is also connected to an engine computer 12, so as to be able to coordinate brake control and engine control. The engine computer 12 is connected to engine 13 and to transmission 14 and governs the global engine control including control of fuel injection amount, control of ignition timing, control of air-fuel ratio, etc. of the engine 13. The engine computer 12 can also detect the gear position of the transmission 14 and can also control gear change in the case of automatic transmission cars.

The above-stated skid control computer 11 can detect a slip state of each wheel by computing a slip rate of the wheel from the wheel speed detected by the associated wheel speed sensor 2. Namely, the wheel speed sensors 2 and the skid control computer 11 function as the slip state detecting means for detecting the slip states of the wheels 1. (It is noted that the slip states can also be detected from factors other than the slip rates; for example, they can also be detected from slip amounts etc.)

The skid control computer 11 selects the wheel 1 to be restrained from slipping, based on the slip rates detected, determines what traction control should be effected at the wheel 1, and actually performs the traction control determined. Namely, the skid control computer 11 also functions as the traction control means which governs the global traction control. The traction control is carried out by exerting the braking force on the wheel, by decreasing the driving force transmitted to the wheel, or by using these in combination.

In the case of the traction control by exerting the braking force on the wheel, the skid control computer 11 determines such a control parameter as to exert a braking force according to the detected slip rate on the wheel and sends a control signal to the brake actuator 8. Namely, the skid control computer 11 also functions as the parameter determining means for determining the control parameter. The control parameter during the traction control by the braking force can be one selected from a pressure increase rate of the hydraulic pressure in the wheel cylinders 5, a target pressure (hydraulic pressure), and so on.

On the other hand, in the case of the traction control by decreasing the driving force transmitted to the wheel, the skid control computer 11 determines such a control parameter as to decrease the driving force according to the detected slip rate of the wheel and sends a control signal to the engine computer 12. The engine computer 12 controls the engine 13, based on the signal from the skid control computer 11. Namely, the skid control computer 11 also functions as the parameter determining means for determining the control parameter in this case. The control parameter during the traction control by the decrease of driving force can be one selected from intake air volume supplied to the engine 13, ignition timing, fuel injection amount, and so on.

The skid control computer 11 determines whether the traction control should be performed, from various conditions of the vehicle and permits the traction control when it should be performed. Permission to perform the traction control is given when predetermined control permission conditions are met. Namely, the skid control computer 11 also functions as the control permitting means.

For example, in order that the traction control is performed only when the driver has the will to run, the condition that the stroke of the accelerator pedal is not less than a predetermined value is set as one of the control permission conditions in certain cases. In such cases, the skid control computer 11 detects the stroke of the accelerator pedal and determines whether it satisfies the permission condition. When the valves (solenoid valves) of the brake actuator 8 described above are hot, there are also cases wherein the traction control is actively inhibited in order to prevent a breakdown of the brake actuator 8. In such cases, the skid control computer 11 monitors the brake actuator 8 and determines whether it satisfies the control permission condition.

Next described is how the traction control is carried out by the traction control apparatus having the above structure.

Figure 2:
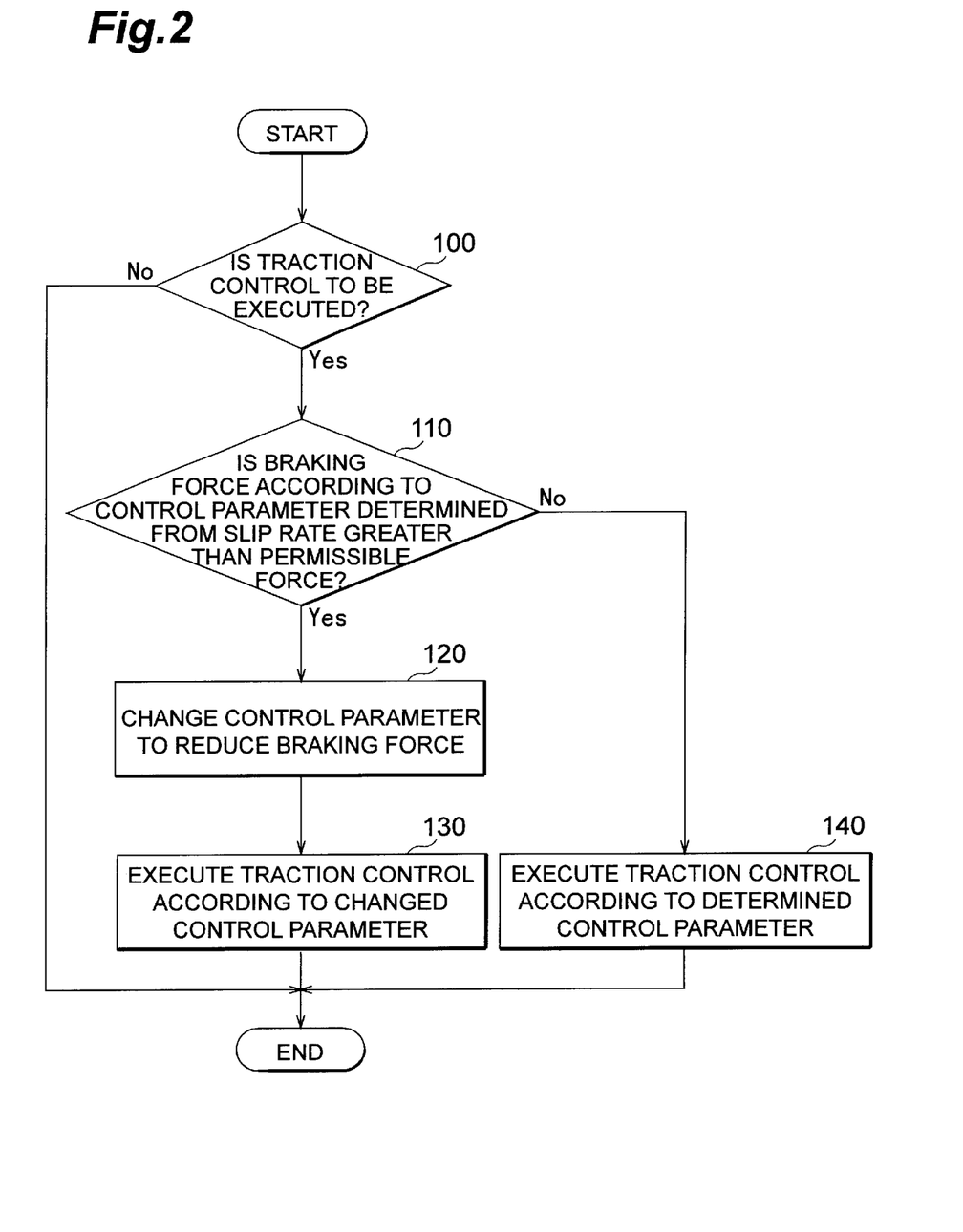
FIG. 2 is a flowchart of the traction control (based on control of braking force) carried out by the traction control apparatus illustrated in FIG. 1.

As described previously, there are the ways of traction control by exerting the braking force on the wheel, by decreasing the driving force transmitted to the wheel, and by using these in combination. First described is the way of traction control by exerting the braking force on the wheel. Described herein is an example in which the control parameter is the pressure increase rate of the brake pressure. FIG. 2 is a flowchart of the traction control by the braking force. The flowchart illustrated in FIG. 2 is stored in the form of a program in a ROM built in the skid control computer 11.

First, it is determined whether all the control permission conditions for the traction control are met, so as to determine whether the traction control is to be executed (step 100). The control permission conditions are that the slip at the wheels 1 is as large as the traction control is necessary, that the control is not in the inhibited state as stated previously, and so on. When it is executed, it is also determined what control (either the control by the braking force, the control by the decrease of driving force, or the combination) is carried out for which wheel 1. As described above, the description herein concerns the case of the traction control at one wheel by braking force.

Next, a control parameter to implement the braking force for restraining the acceleration slip is computed based on the slip rate detected. In this example the pressure increase rate of the brake pressure is adopted as the control parameter. Specifically, the pressure increase rate of the brake pressure is controlled by changing the open/close duty ratio of the valve of the brake actuator 8. The valve of the brake actuator 8 is constructed to increase the oil pressure in an open state thereof and maintain the brake pressure in a closed state, and the pressure increase rate of the brake pressure can be controlled by adjusting this open/close duty ratio of the valve. It is determined whether the braking force generated at the wheel 1 according to this determined control parameter is over a permissible braking force preliminarily determined (step 110).

In this example the comparison of braking force is carried out using the open/close duty ratio of the valve described above. If the braking force according to the control parameter determined is not over the permissible braking force, the traction control is carried out based on the determined control parameter (step 140). If the braking force according to the determined control parameter is over the permissible braking force according to the other hand, the control parameter is changed so as to decrease the braking force (step 120), because the braking force acting to the wheel 1 is too large at the start of the traction control.

The braking force is also reduced here by adjusting the open/close duty ratio of the valve described above. For example, where opening/closing of the valve is controlled by the open/close duty ratio every 50 milliseconds, the braking force is judged as being over the permissible braking force in the case of the operation of opening for 20 milliseconds and closing for 30 milliseconds in 50 milliseconds and this is changed into the operation of opening for 10 milliseconds and closing for 40 milliseconds in 50 milliseconds. When the control parameter is changed, the traction control is carried out based on the control parameter after this change (step 130).

According to the control as described above, the braking force can be reduced by changing the control parameter, where the slip rate of the wheel 1 is already so large at the time of permission of the traction control as to exert great braking force thereon immediately after the start of the traction control. As a consequence, the above control can suppress the large input into the power train and can restrain the uncomfortableness such as the jerky motion and the rushing motion of the vehicle, and so on.

The following situations are considered as specific examples of the cases wherein the slip rate of the wheel 1 is already large at the time of permission of the traction control. A situation is such that at idle of an automatic transmission car a certain wheel 1 is already spinning while getting ditched or stuck and from this state the accelerator pedal is stepped on down to the predetermined pedal stroke of the traction control permission condition. Under this situation the slip rate of the spinning wheel is already large at the time of permission of the traction control. Therefore, if the control to change the control parameter as described above were not carried out the spinning of the wheel 1 would be stopped suddenly. In this case, a large torque would be exerted on the power train and the driving force would be transmitted suddenly to the other wheel keeping adhesion, thereby invoking the uncomfortableness such as the jerky motion and the rushing motion of the vehicle, and so on.

Another situation is such that the traction control is temporarily in the inhibited state because of the hot state or the like of the valve of the brake actuator 8 and the slip rate is already large when the inhibited state of the traction control is cleared by overcoming the hot state of the valve. In this situation the traction control is permitted at the same time as the return from the inhibited state. If the control to change the control parameter as described above were not carried out when the slip rate was already large at the time of permission of the traction control, the large torque would be exerted on the power train and the driver would feel uncomfortable because of the jerky motion and the rushing motion of the vehicle.

In the example described above, the pressure increase rate of the brake pressure being the control parameter was retarded by changing the open/close duty ratio of the valve of the brake actuator 8 in order to reduce the braking force. In this case, the braking force is reduced by making a rise of the braking force gentler in the traction control. At this time a judgment is made using the pressure increase rate (specifically, the open/close duty ratio of the valve), in the comparison with the permissible braking force.

However, the control parameter may also be a target pressure of the brake oil pressure and the braking force may be reduced by changing this target pressure to a lower pressure. In this case, the braking force is reduced by decreasing the maximum of the braking force in the traction control. For the comparison with the permissible braking force in this case, a judgment is made using the target pressure. For carrying out this control, pressure sensors for detecting the oil pressure in the wheel cylinders 5 are installed and the oil pressure under control is detected thereby. Since the control in this structure is similar to the control according to the flowchart illustrated in FIG. 2 and described above, detailed description thereof is omitted herein. The oil pressure may also be estimated based on actuation amounts (for example, the open/close duty ratios of the valves) of the brake actuator 8, instead of the pressure sensors.

In the above-stated example, whether the control parameter should be changed is always determined at the start of the traction control, but the flow may also be arranged so that the determination is made only in some specific situations. For example, the determination about whether the control parameter should be changed can be made only when the present situation is judged as a situation of the large slip rate. The judgment about whether the present situation is the situation of the large slip rate or not will be described briefly below.

When a certain wheel 1 is stuck, all the following conditions (1) to (4) need to be met in order to determine that the braking force according to the control parameter determined from the slip rate of the wheel 1 is over the permissible braking force.

(1) (highest wheel speed among the four wheels)≦(first wheel speed threshold)

(2) (second highest wheel speed among the four wheels) ≦(second wheel speed threshold)

(3) (vehicle speed)≦(vehicle speed threshold)

(4) The braking force according to the determined control parameter is over the permissible braking force.

However, (first wheel speed threshold)>(second wheel speed threshold), and (first wheel speed threshold)>(vehicle speed threshold). The vehicle speed herein is assumed to be the lowest wheel speed among the four wheels. Further, as to Condition (4), the judgment is also made from the open/close duty ratios of the valves of the brake actuator 8 herein.

If the first wheel speed threshold is set sufficiently larger than the second wheel speed threshold and the vehicle speed threshold and if the second wheel speed threshold and the vehicle speed threshold are set sufficiently small, Conditions (1) to (3) allows us to determine that the wheel demonstrating the highest wheel speed among the four wheels gets stuck. If Condition (4) is also met at the same time, it can be determined that a large braking force will act to the spinning wheel 1 upon permission of the traction control (for example, when the pedal stroke reaches the predetermined value).

In such cases, the control parameter is changed by the above-stated control, so as to restrain the large input into the power train and suppress the uncomfortableness such as the rushing motion of the vehicle due to sudden delivery of driving force to the wheel 1 keeping adhesion (steps 120, 130).

The above-stated thresholds (first wheel speed threshold, second wheel speed threshold, and vehicle speed threshold) may be subjected to variable control, depending upon various states of the vehicle. A specific example of the variable control is an off-road vehicle having a sub-transmission. For example, when the sub-transmission is in the Low range, the first wheel speed threshold can also be set to a value obtained by dividing the first wheel speed threshold in the High range by a gear ratio in the Low range. This allows more appropriate control to be executed according to the states of the vehicle.

Figure 3:
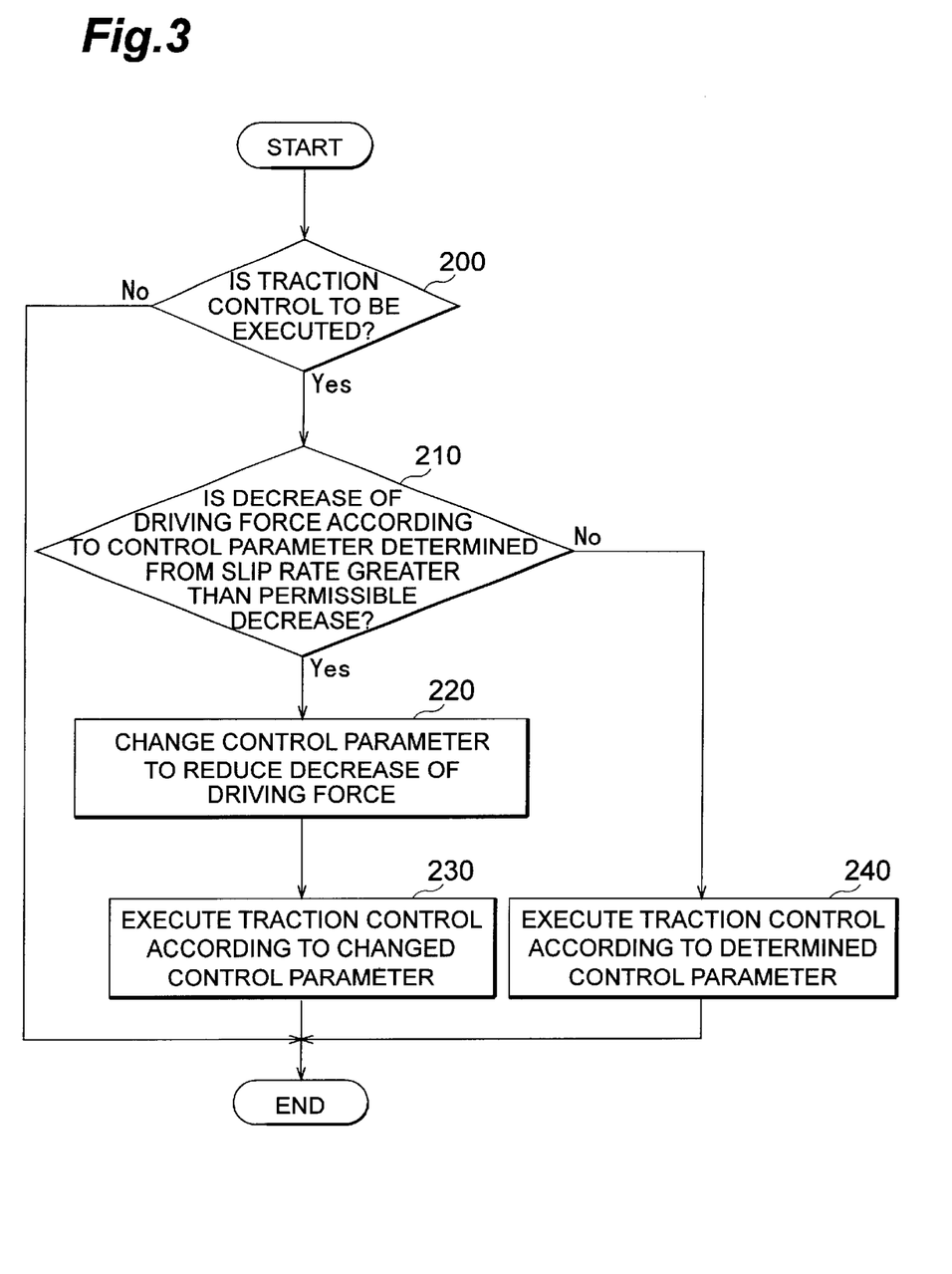
FIG. 3 is a flowchart of the traction control (based on control of driving force) carried out by the traction control apparatus illustrated in FIG. 1.

Next, the traction control by decreasing the driving force transmitted to the wheels will be described. Described herein is an example in which the control parameter is the intake air volume. FIG. 3 is a flowchart to show the traction control by the decrease of the driving force. The flowchart illustrated in FIG. 3 is also stored in the form of a program in the ROM built in the skid control computer 11.

First, it is determined whether all the control permission conditions for the traction control are met, so as to determine whether the traction control is to be executed (step 200). When it is executed, it is also determined what control (either the control by the braking force, the control by the decrease of the driving force, or the combination thereof) should be carried out for which wheel 1. As described above, the description herein concerns the case of the traction control at one wheel by driving force. Next, the control parameter to realize the decrease of the driving force for suppressing the acceleration slip is computed based on the slip rate detected.

In this example the intake air volume of the engine 11 is determined as a control parameter. Specifically, a sub-throttle valve for the traction control is provided in addition to the main throttle valve and the intake air volume is controlled by changing the travel of this sub-throttle valve. It is then determined whether a decrease of the traction according to the determined control parameter is over a permissible decrease amount preliminarily set (step 210).

If the decrease of the driving force according to the determined control parameter is not over the permissible decrease amount, the traction control is carried out based on the determined control parameter (step 240). If the decrease of the driving force according to the determined control parameter is over the permissible decrease amount on the other hand, the control parameter is changed so as to decrease the decrease of the driving force (step 220). When the control parameter is changed, the traction control is carried out based on the control parameter after this change (step 230).

This control can also decrease the decrease of the driving force by changing the control parameter in the cases wherein the slip rate of the wheel 1 is already large at the time of permission of the traction control and the decrease amount of the driving force can be large immediately after the start of the traction control. As a consequence, the control can restrain the uncomfortableness such as the stall feeling, the engine shake, and the like.

In the example described above the intake air volume of the engine 13 was changed by the travel of the sub-throttle in order to decrease the driving force, but the intake air volume may also be changed by the travel of the main throttle valve without provision of the sub-throttle. The control parameter for decreasing the driving force can also be one selected from the ignition timing, the fuel injection amount, etc., in addition to the intake air volume described above.

It is noted that the traction control apparatus for vehicles according to the present invention is not limited to the above embodiment. For example, the traction control by the braking force and the traction control by the decrease of the driving force were described separately in the above embodiment, but they may also be used in combination. In this case, the proportion of the controls can be determined, for example, by the skid control computer 11. In the above-stated embodiment the permissible braking force and the permissible decrease amount of the driving force were set as fixed values, but they may also be subjected to variable control based on various state amounts of the vehicle.

Figure 4:
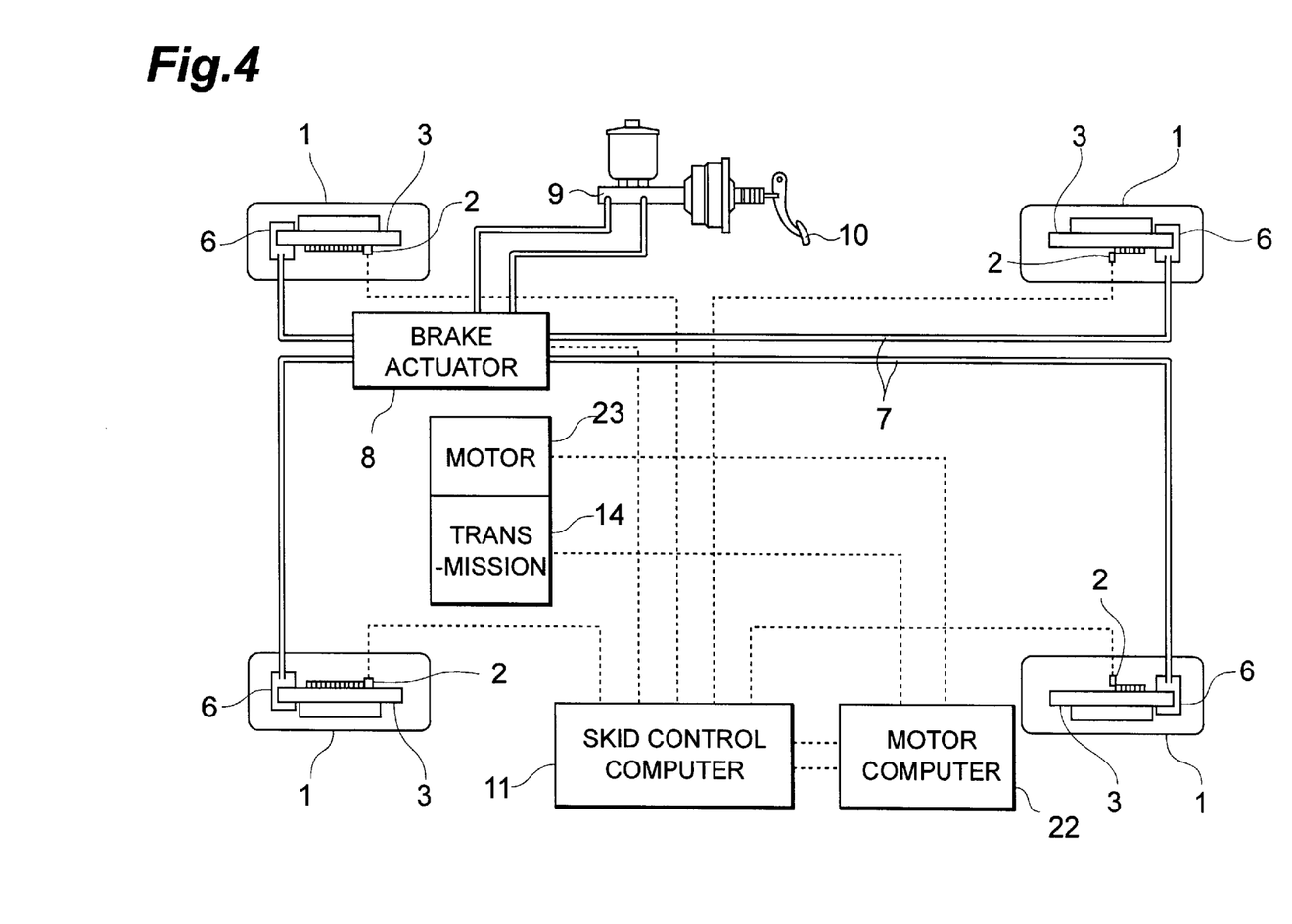
FIG. 4 is a structural diagram to show the structure of another embodiment of the traction control apparatus for vehicles according to the present invention.

The present invention can also be applied to vehicles other than the engine (internal combustion engine) vehicles, for example, to electric cars using an electric motor as a driving source. FIG. 4 is a structural diagram, corresponding to FIG. 1A, to show an example of application of the present invention to an electric car. In the vehicle illustrated in FIG. 4, a motor 23 acts similar to the engine 13 in the above embodiment, and a motor computer 22 acts similar to the engine computer 13 in the above embodiment. The present invention can also be applied to hybrid cars using a combination of an engine with an electric motor.

The traction control apparatus for vehicles according to the present invention has the parameter changing means for changing the control parameter so as to decrease the braking force generated at the wheel when the control parameter determined from the slip rate of the wheel at the time of permission of traction control given by the control permitting means is one to generate the braking force at the wheel over the permissible braking force which is permissible at the start of the control. The traction control apparatus for vehicles according to the present invention also has the parameter changing means for changing the control parameter so as to decrease the decrease amount of the driving force when the control parameter determined from the slip rate of the wheel at the time of permission of traction control given by the control permitting means is one to cause the decrease of the driving force over the permissible decrease amount which is permissible at the start of the control. Therefore, the apparatus can restrain the uncomfortableness during the traction control. Particularly, in the case of the decrease of the braking force, a large torque can be prevented from entering the power train, in addition.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A traction control apparatus for vehicles comprising:
   slip state detecting means for detecting a slip state of a wheel mounted on a vehicle;
   parameter determining means for determining a control parameter for generating braking force according to the slip state detected by said slip state detecting means;
   control permitting means for permitting traction control;
   parameter changing means for changing said control parameter so as to decrease the braking force generated at said wheel when said determined control parameter at the time of permission of the traction control given by said control permitting means is one to generate the braking force at said wheel over permissible braking force at a start of the control; and
   traction control means for executing the traction control by controlling the braking force at said wheel, based on said changed control parameter.

2. The traction control apparatus for vehicles according to claim 1, wherein said traction control means comprises braking force adjusting means for effecting braking at said wheel by increasing hydraulic pressure in a wheel cylinder to urge a frictional material against said wheel or against a rotary member coupled thereto, and
   wherein said control parameter is a pressure increase rate of said hydraulic pressure and said parameter changing means changes said pressure increase rate determined by said parameter determining means, to a lower rate.

3. The traction control apparatus for vehicles according to claim 1, wherein said traction control means comprises braking force adjusting means for effecting braking at said wheel by increasing hydraulic pressure in a wheel cylinder to urge a frictional material against said wheel or against a rotary member coupled thereto, and
   wherein said control parameter is a target pressure of said hydraulic pressure and said parameter changing means changes said target pressure determined by said parameter determining means, to a lower pressure value.

4. A traction control apparatus for vehicles comprising:
   slip state detecting means for detecting a slip state of a wheel mounted on a vehicle;
   parameter determining means for determining a control parameter for decreasing driving force transmitted to said wheel in accordance with the slip state detected by said slip state detecting means;
   control permitting means for permitting traction control;
   parameter changing means for changing said control parameter so as to decrease a decrease amount of the driving force when said determined control parameter at the time of permission of the traction control given by said control permitting means is one to cause a decrease of the driving force over a permissible decrease amount at a start of the control; and
   traction control means for executing the traction control by decreasing the driving force transmitted to said wheel, based on said changed control parameter.

5. The traction control apparatus for vehicles according to claim 4, wherein said traction control means comprises driving force adjusting means for adjusting driving force generated by an engine and transmitted to said wheel, and
   wherein said control parameter is intake air volume of said engine and said parameter changing means changes said intake air volume determined by said parameter determining means, to larger volume so as to decrease said driving force.

6. The traction control apparatus for vehicles according to claim 4, wherein said traction control means comprises driving force adjusting means for adjusting driving force generated by an engine and transmitted to said wheel, and wherein said control parameter is a fuel injection amount of said engine and said parameter changing means changes said fuel injection amount determined by said parameter determining means, to a smaller amount so as to decrease said driving force.

7. The traction control apparatus for vehicles according to claim 4, wherein said traction control means comprises driving force adjusting means for adjusting driving force generated by an engine and transmitted to said wheel, and wherein said control parameter is ignition timing of said engine and said parameter changing means changes said ignition timing determined by said parameter determining means, so as to decrease said driving force.

8. The traction control apparatus for vehicles according to claim 4, wherein said traction control means comprises driving force adjusting means for adjusting driving force generated by an electric motor and transmitted to said wheel, and wherein said control parameter is output torque of said electric motor and said parameter changing means changes said output torque determined by said parameter determining means, so as to decrease said driving force.

9. A traction control method for vehicles comprising the steps of:

detecting a slip state of a wheel mounted on a vehicle;

determining a control parameter for generating braking force according to the detected slip state;

permitting traction control;

changing said control parameter so as to decrease the braking force generated at said wheel when said determined control parameter at the time of permission of the traction control is one to generate the braking force at said wheel over permissible braking force at a start of the control; and executing the traction control by controlling the braking force at said wheel, based on said changed control parameter.

10. The traction control method for vehicles according to claim 9, wherein the step of executing the traction control includes effecting braking at said wheel by increasing hydraulic pressure in a wheel cylinder to urge a frictional material against said wheel or against a rotary member coupled thereto, wherein the step of determining said control parameter includes determining a pressure increase rate of said hydraulic pressure as said control parameter, and wherein the step of changing said control parameter includes changing said determined pressure increase rate to a lower rate.

11. The traction control method for vehicles according to claim 9, wherein the step of executing the traction control includes effecting braking at said wheel by increasing hydraulic pressure in a wheel cylinder to urge a frictional material against said wheel or against a rotary member coupled thereto, wherein the step of determining said control parameter includes determining a target pressure of said hydraulic pressure as said control parameter, and wherein the step of changing said control parameter includes changing said determined target pressure to a lower pressure value.

12. A traction control method for vehicles comprising the steps of:

detecting a slip state of a wheel mounted on a vehicle;

determining a control parameter for decreasing driving force transmitted to said wheel in accordance with the detected slip state;

permitting traction control;

changing said control parameter so as to decrease a decrease amount of the driving force when said determined control parameter at the time of permission of the traction control is one to cause a decrease of the driving force over a permissible decrease amount at a start of the control; and executing the traction control by decreasing the driving force transmitted to said wheel, based on said changed control parameter.

13. The traction control method for vehicles according to claim 12, wherein the step of executing the traction control includes adjusting driving force generated by an engine and transmitted to said wheel, wherein the step of determining said control parameter includes determining intake air volume of said engine as said control parameter, and wherein the step of changing said control parameter includes changing said determined intake air volume to larger volume so as to decrease said driving force.

14. The traction control method for vehicles according to claim 12, wherein the step of executing the traction control includes adjusting driving force generated by an engine and transmitted to said wheel, wherein the step of determining said control parameter includes determining a fuel injection amount of said engine as said control parameter, and wherein the step of changing said control parameter includes changing said determined fuel injection amount to a smaller amount so as to decrease said driving force.

15. The traction control method for vehicles according to claim 12, wherein the step of executing the traction control includes adjusting driving force generated by an engine and transmitted to said wheel, wherein the step of determining said control parameter includes determining ignition timing of said engine as said control parameter, and wherein the step of changing said control parameter includes changing said determined ignition timing so as to decrease said driving force.

16. The traction control method for vehicles according to claim 12, wherein the step of executing the traction control includes adjusting driving force generated by an electric motor and transmitted to said wheel, wherein the step of determining said control parameter includes determining output torque of said electric motor as said control parameter, and wherein the step of changing said control parameter includes changing said determined output torque so as to decrease said driving force.

* * * * *